United States Patent
Tan et al.

(10) Patent No.: US 9,998,531 B2
(45) Date of Patent: Jun. 12, 2018

(54) COMPUTER-BASED, BALANCED PROVISIONING AND OPTIMIZATION OF DATA TRANSFER RESOURCES FOR PRODUCTS AND SERVICES

(71) Applicant: International Business Machines Corporation, Armonk, NY (US)

(72) Inventors: Wei Tan, New York, NY (US); Guohui Wang, Foster City, CA (US); Zhe Zhang, New York, NY (US)

(73) Assignee: INTERNATIONAL BUSINESS MACHINES CORPORATION, Armonk, NY (US)

(\*) Notice: Subject to any disclaimer, the term of this patent is extended or adjusted under 35 U.S.C. 154(b) by 365 days.

(21) Appl. No.: 14/030,041

(22) Filed: Sep. 18, 2013

(65) Prior Publication Data

US 2015/0081908 A1 Mar. 19, 2015

(51) Int. Cl.
*G06F 15/173* (2006.01)
*H04L 29/08* (2006.01)
*H04L 12/24* (2006.01)

(52) U.S. Cl.
CPC ........ *H04L 67/1038* (2013.01); *G06F 15/173* (2013.01); *H04L 41/5025* (2013.01); *H04L 41/5054* (2013.01)

(58) Field of Classification Search
CPC . H04L 67/1038; H04L 41/0803; H04L 41/08; H04L 47/17; H04L 47/70
USPC ........................................................ 709/226
See application file for complete search history.

(56) References Cited

U.S. PATENT DOCUMENTS

| | | | | |
|---|---|---|---|---|
| 5,884,037 A | * | 3/1999 | Aras | H04L 12/5695 709/226 |
| 6,775,701 B1 | * | 8/2004 | Pan | H04L 12/5695 709/226 |
| 7,020,145 B1 | * | 3/2006 | Symons | H04L 12/46 370/400 |
| 7,020,161 B1 | * | 3/2006 | Eberle | H04L 12/403 370/395.2 |

(Continued)

FOREIGN PATENT DOCUMENTS

| | | |
|---|---|---|
| WO | 2012149748 A1 | 11/2012 |
| WO | 2013036453 A1 | 3/2013 |

OTHER PUBLICATIONS

Bux et al., "Parallelization in Scientific Workflow Management Systems," arXiv preprint arXiv:1303.7195, Mar. 28, 2013, pp. 1-24.

(Continued)

*Primary Examiner* — Krista Zele
*Assistant Examiner* — Timothy Sowa
(74) *Attorney, Agent, or Firm* — Cantor Colburn LLP (57) ABSTRACT

A computer program product for provisioning resources in a balanced data transfer pipeline may associate a first requested task with a first category, allocate a first resource of a data path to the first requested task based on the first resource corresponding to the first category; and allocate a second resource as part of the data path to the first requested task based on the second resource corresponding to the first category, wherein the first resource corresponds to a first segment of the data path and the second resource corresponds to a second segment of the data path.

9 Claims, 7 Drawing Sheets

(56) References Cited

U.S. PATENT DOCUMENTS

| | | | | |
|---|---|---|---|---|
| 7,401,154 B2* | 7/2008 | Ignatius | G06F 3/0613 | 709/214 |
| 7,953,000 B2* | 5/2011 | Baker | H04L 43/00 | 370/230 |
| 7,995,618 B1* | 8/2011 | Bjerregaard | H04L 7/00 | 370/503 |
| 9,075,654 B1* | 7/2015 | Goikhman | G06F 9/50 | 718/100 |
| 2002/0112030 A1* | 8/2002 | Iwami | G06F 3/0611 | 709/219 |
| 2003/0126195 A1* | 7/2003 | Reynolds | G06F 1/14 | 709/203 |
| 2004/0054850 A1* | 3/2004 | Fisk | H04L 41/08 | 711/112 |
| 2006/0053261 A1* | 3/2006 | Prahlad | G06F 3/0605 | 711/162 |
| 2007/0198722 A1* | 8/2007 | Kottomtharayil | H04L 47/70 | 709/226 |
| 2008/0155087 A1* | 6/2008 | Blouin | H04L 43/0817 | 709/223 |
| 2008/0222267 A1* | 9/2008 | Horn | H04L 29/12594 | 709/217 |
| 2010/0017517 A1* | 1/2010 | Arai | G06F 9/5077 | 709/226 |
| 2012/0047265 A1* | 2/2012 | Agarwala | G06F 9/5072 | 709/226 |
| 2012/0084443 A1* | 4/2012 | Theimer | G06F 9/45533 | 709/226 |
| 2012/0106354 A1* | 5/2012 | Pleshek | H04L 43/12 | 370/241 |
| 2012/0170462 A1* | 7/2012 | Sinha | H04L 12/4641 | 370/236 |
| 2012/0246637 A1* | 9/2012 | Kreeger | H04L 45/54 | 718/1 |
| 2012/0331144 A1* | 12/2012 | Supalov | G06F 9/5072 | 709/226 |
| 2013/0297752 A1* | 11/2013 | Bhanujan | H04L 41/0803 | 709/220 |
| 2013/0332935 A1* | 12/2013 | Varma | G06F 9/5011 | 718/104 |
| 2014/0344401 A1* | 11/2014 | Varney | H04L 67/1097 | 709/217 |
| 2015/0081912 A1* | 3/2015 | Tan | H04L 67/1038 | 709/226 |

OTHER PUBLICATIONS

Irwin et al. "Resource Management in Data-Intensive Clouds: Opportunities and Challenges" Local and Metropolitan Area Networks (LANMAN), 2010 17th IEEE Workshop on. IEEE, 2010, pp. 1-6.

Kettimuthu, "Globus XIO Pipe Open Driver: Enabling GridFTP to Leverage Standard Unix Tools" Proceedings of the 2011 TeraGrid Conference: Extreme Digital Discovery. ACM, 2011, pp. 1-7.

Yang et al., "Dynamic scratch-pad memory management with data pipelining for embedded systems," Concurrency and Computation: Practice and Experience Concurrency Computat.: Pract. Exper. 2010; 22:1874-1892.

* cited by examiner

COMPUTER-BASED, BALANCED PROVISIONING AND OPTIMIZATION OF DATA TRANSFER RESOURCES FOR PRODUCTS AND SERVICES

BACKGROUND

The present invention relates to resource provisioning, and more specifically, to balanced resource provisioning and optimized data transfer in a networked computing environment.

SUMMARY

According to one embodiment of the present invention, a computer program product for provisioning resources includes a computer readable storage medium having stored thereon program instructions executable by a processor to cause the processor to associate a first requested task with a first category, allocate a first resource of a data path to the first requested task based on the first resource corresponding to the first category; and allocate a second resource as part of the data path to the first requested task based on the second resource corresponding to the first category, wherein the first resource corresponds to a first segment as part of the data path and the second resource corresponds to a second segment of the data path.

According to another embodiment of the present invention, a computer program product for provisioning resources includes a computer readable storage medium having stored thereon program instructions executable by a processor to cause the processor to map a plurality of available resources corresponding to a first segment of a data path to a plurality of categories, wherein each available resource corresponding to the first segment is associated with one of the categories, map a plurality of available resources corresponding to a second segment of the data path to the plurality of categories, wherein each available resource corresponding to the second segment is associated with one of the categories, and allocate a first resource of the plurality of available resources corresponding to the first segment and a second resource of the plurality of available resources corresponding to the second segment to a requested task based on the first and second resources being associated with a same category of the plurality of categories.

According to other embodiments, the computer readable storage medium can further have stored thereon program instructions executable by the processor to cause the processor to verify that every segment of the data path includes an available resource corresponding to the first category, perform the first list of tasks before performing the second list of tasks, and allocate an available resource corresponding to each segment of the data path to the requested task based on each of the allocated resources being associated with the same category.

According to other embodiments, the computer readable storage medium can further have stored thereon program instructions executable by the processor to cause the processor to receive a resource status corresponding to the first segment, update the resource status corresponding to the first segment to indicate that the first resource has been allocated, and decompose a plurality of requested tasks to form a first list of tasks for which every segment of the data path includes an available resource corresponding to a first associated category and a second list of tasks for which at least one segment of the data path does not include an available resource corresponding to a second associated category.

According to other embodiments, the computer readable storage medium can further have stored thereon program instructions executable by the processor to cause the processor to receive a requested category, determine whether at least one of the available resources corresponding to the first segment is associated with the requested category, and select the same category to be different than the requested category based on a determination that none of the available resources corresponding to the first segment is associated with the requested category.

According to other embodiments, the computer readable storage medium can further have stored thereon program instructions executable by the processor to cause the processor to receive a task associated with a requested category, determine whether at least one of the available resources corresponding to the first segment is associated with the requested category, and delay performing the task based on a determination that none of the available resources corresponding to the first segment is associated with the requested category.

According to other embodiments, the computer readable storage medium can further have stored thereon program instructions executable by the processor to cause the processor to map a plurality of available resources corresponding to a third segment of an alternate data path, According to other embodiments, each of the categories may correspond to a relative capacity range, each of the available resources may correspond to the first segment includes a storage medium, and each of the categories may correspond to a type of storage medium, and each of the available resources corresponding to the first segment includes a network, and each of the categories corresponds to a network protocol or bandwidth.

According to another embodiment of the present invention, a method for provisioning resources may include mapping a plurality of available resources corresponding to a first segment of a data path to a plurality of categories, wherein each available resource corresponding to the first segment is associated with one of the categories, mapping a plurality of available resources corresponding to a second segment of the data path to the plurality of categories, wherein each available resource corresponding to the second segment is associated with one of the categories, and allocating a first resource of the plurality of available resources corresponding to the first segment and a second resource of the plurality of available resources corresponding to the second segment to a requested task based on the first and second resources being associated with a same category of the plurality of categories.

According to another embodiment of the present invention, the method may further include allocating an available resource corresponding to each segment of the data path to the requested task based on each of the allocated resources being associated with the same category.

According to another embodiment of the present invention, the method may further include receiving a requested category, determining whether at least one of the available resources corresponding to the first segment is associated with the requested category, and selecting the same category to be different than the requested category based on a determination that none of the available resources corresponding to the first segment is associated with the requested category.

According to another embodiment of the present invention, the method may further include receiving a task associated with a requested category, determining whether at least one of the available resources corresponding to the first segment is associated with the requested category, and delaying performance of the task based on a determination that none of the available resources corresponding to the first segment is associated with the requested category.

According to other embodiments, each of the categories may correspond to a relative capacity range, each of the available resources may correspond to the first segment includes a storage medium and each of the categories may correspond to a type of storage medium, each of the available resources may corresponding to the first segment may include a network and each of the categories may correspond to a network protocol or bandwidth.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
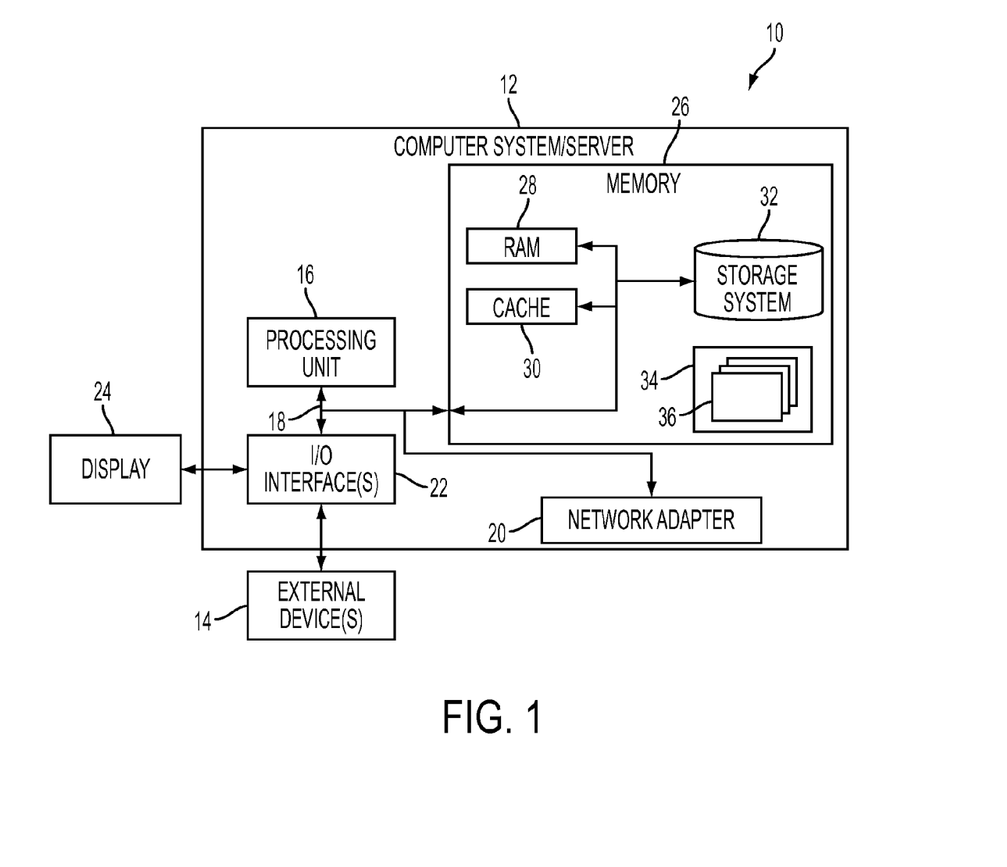
FIG. 1 is a schematic diagram of a cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 26, and a bus 18 that couples various system components including system memory 26 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 26 can include computer system readable media in the form of volatile memory, such as random access memory (RAM) 28 and/or cache memory 30. Computer system/server 12 may further include other removable/non-removable, volatile/non-volatile computer system storage media. By way of example only, storage system 32 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 26 may include at least one program product having a set (e.g., at least one) of program modules that are configured to carry out the functions of embodiments of the invention.

Program/utility 34, having a set (at least one) of program modules 36, may be stored in memory 26 by way of example, and not limitation, as well as an operating system, one or more application programs, other program modules, and program data. Each of the operating system, one or more application programs, other program modules, and program data or some combination thereof, may include an implementation of a networking environment. Program modules 36 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
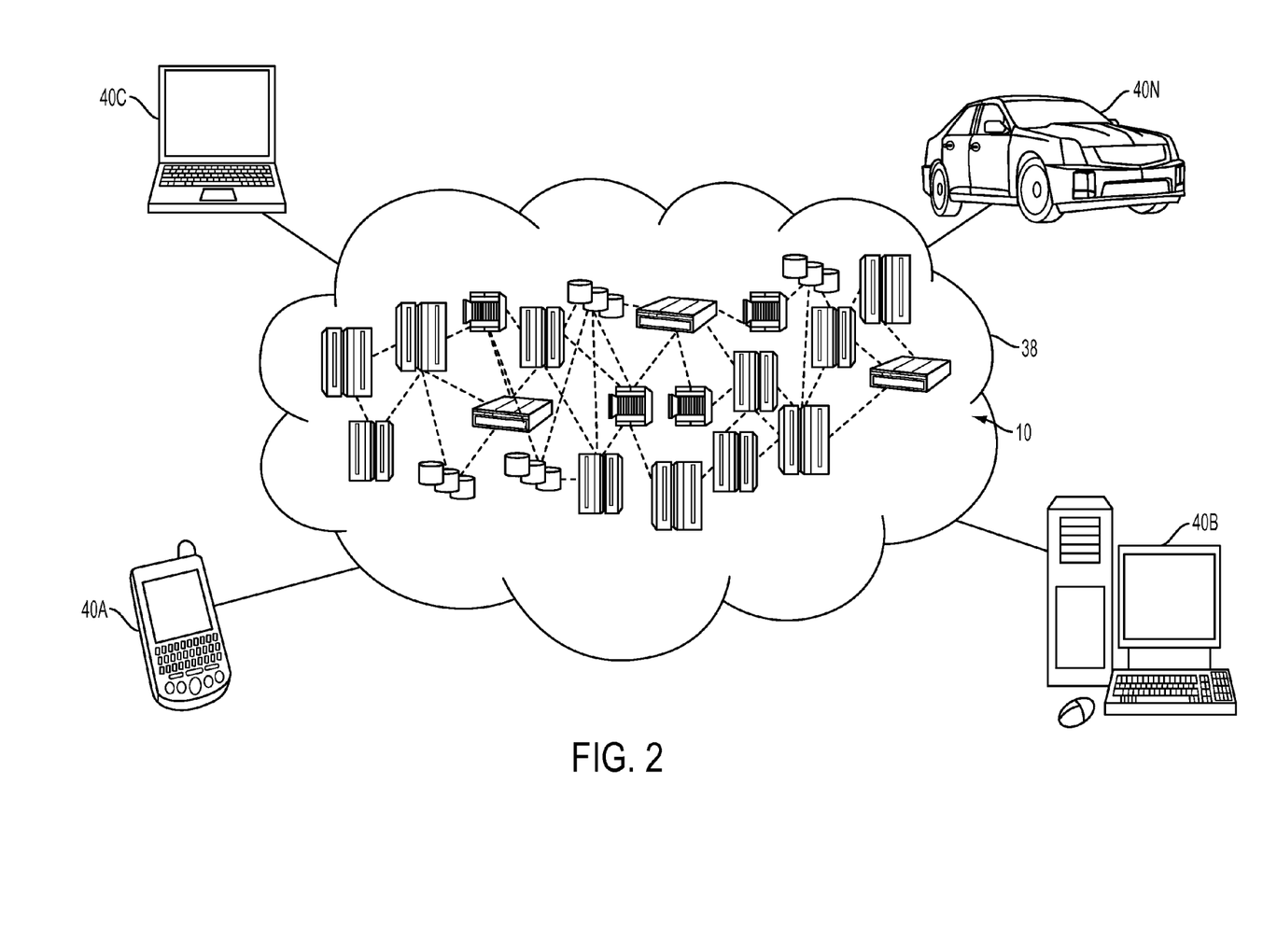
FIG. 2 is a schematic diagram of a cloud computing environment according to an embodiment of the present invention.

Referring now to FIG. 2, illustrative cloud computing environment 38 is depicted. As shown, cloud computing environment 38 comprises one or more cloud computing nodes 10 with which local computing devices used by cloud consumers, such as, for example, personal digital assistant (PDA) or cellular telephone 40A, desktop computer 40B, laptop computer 40C, and/or automobile computer system 40N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 38 to offer infrastructure, platforms and/or software as services for which a cloud consumer does not need to maintain resources on a local computing device. It is understood that the types of computing devices 40A-N shown in FIG. 2 are intended to be illustrative only and that computing nodes 10 and cloud computing environment 38 can communicate with any type of computerized device over any type of network and/or network addressable connection (e.g., using a web browser).

Figure 3:
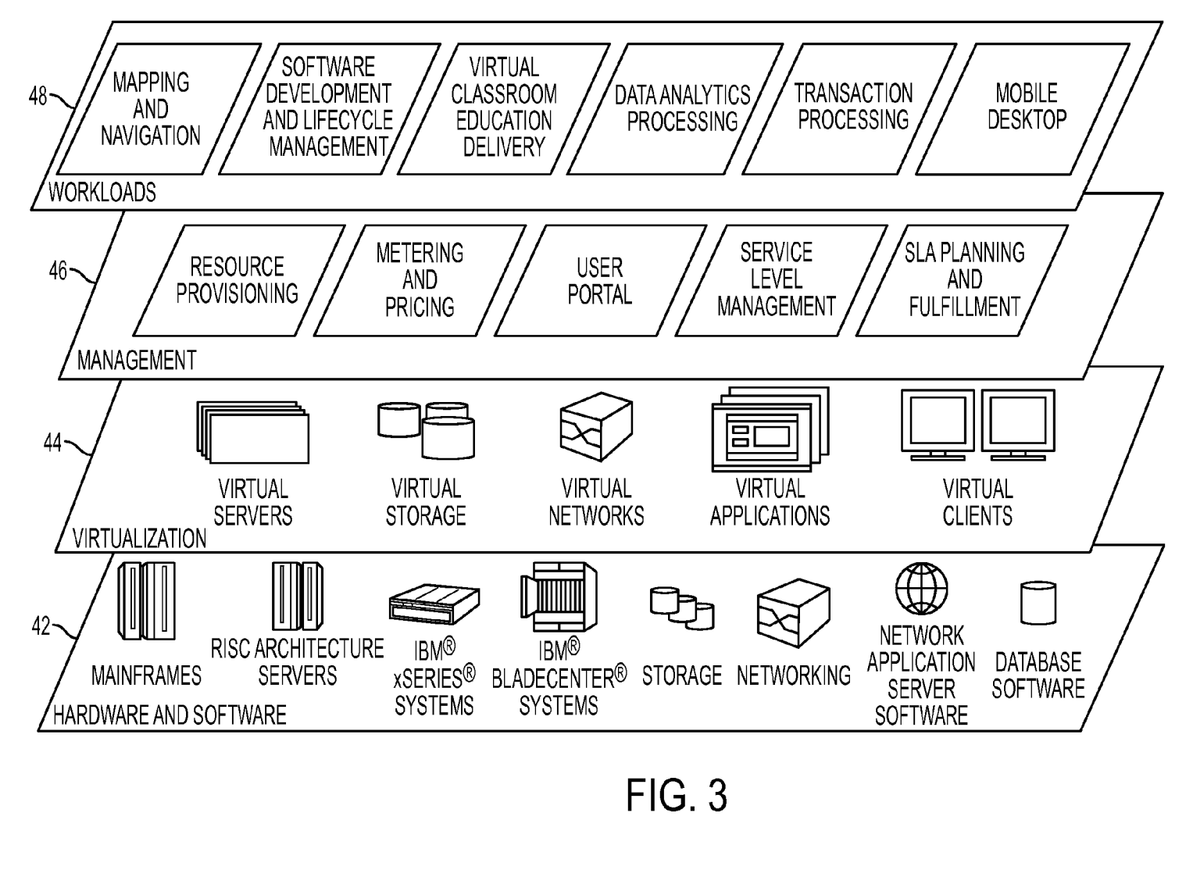
FIG. 3 is a schematic diagram of abstraction model layers according to an embodiment of the present invention.

Referring now to FIG. 3, a set of functional abstraction layers provided by cloud computing environment 38 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 36 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 44 provides an abstraction layer from which the following examples of virtual entities may be provided: virtual servers; virtual storage; virtual networks, including virtual private networks; virtual applications and operating systems; and virtual clients.

In one example, management layer 46 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 48 provides examples of functionality for which the cloud computing environment may be utilized. Examples of workloads and functions which may be provided from this layer include: mapping and navigation; software development and lifecycle management; virtual classroom education delivery; data analytics processing; transaction processing; and mobile desktop.

However, in a cloud environment data storage services may be provisioned through a relatively lengthy data path, or pipeline, which may include, for example, a client network interface, a network channel (e.g., fiber channel, Ethernet, etc.), a cache layer in the storage area network (SAN) and the particular storage media utilized in the SAN. Point technology methods that have attempted to optimize only an individual component or segment of the pipeline, such as the networking, caching or storage media, have failed to achieve a globally optimized solution.

An embodiment of the present invention proposes a holistic approach to formulate a balanced data transfer pipeline, taking into account the nature and needs of applications (e.g., a read request or an asynchronous write request), the network interface, the network channel, and the storage media (e.g., solid-state device [SSD] or a hard disk drive [HDD]). Thus, overall or user-observed data transfer performance, as well as the system utilization may be relatively optimized.

With regard to the resource provisioning function of the management layer 46, an embodiment of the present invention may provide dynamic procurement of matched computing and other resources that may be utilized to perform tasks, such as, for example, data transfer in the cloud computing environment 38 of FIG. 2. For example, an embodiment of the present invention may provision matched resources in each segment of a data transfer path, for example, based on the relative capacity of the resources, such as, for example, with regard to the speed, bandwidth, reliability, latency or current congestion of the resources, in order to provide a balanced data transfer pipeline.

While an embodiment of the present invention may attempt to optimize local resources of each segment of the data transfer path, priority may be placed on matching the component resources of each segment of the data transfer path with the component resources of every other segment of the data transfer path. In this manner, an embodiment of the present invention may create a balanced data transfer pipeline wherein the component resources of each segment of the data transfer path may be relatively closely matched, for example, with respect to the data transfer capacity of each component resource.

For example, many types of "write" requests, such as a virtual machine (VM) image capture or a MapReduce (MR) input/output request, may be buffered or queued, and typically are not particularly sensitive to latency, but often may be more sensitive to data path throughput. On the other hand, asynchronous input/output (MO) requests, such as those related to a background process, may be relatively less sensitive to latency.

Quality-of-Service (QoS) generally may be determined by the slowest component, or performance bottleneck, in a data transfer pipeline, that is, the component with the lowest bandwidth, greatest latency, etc. Allocation of relatively higher capacity components, or resources, together with relatively lower capacity components in a data transfer pipeline, or data path, may result in suboptimal resource allocation and provisioning, resulting in wasteful utilization of resources and an overall higher cost of data transfer.

Resources may be used more optimally and the associated overall cost of data transfer may be reduced by implemented a coordinated optimization of resources along an entire data transfer pipeline. This approach attempts to match, or map, resources in each segment of the pipeline having relatively close capacities. This approach can reserve use of relatively high capacity components for requests that require such capacity, resulting in overall increased performance of data transfers.

Figure 4:
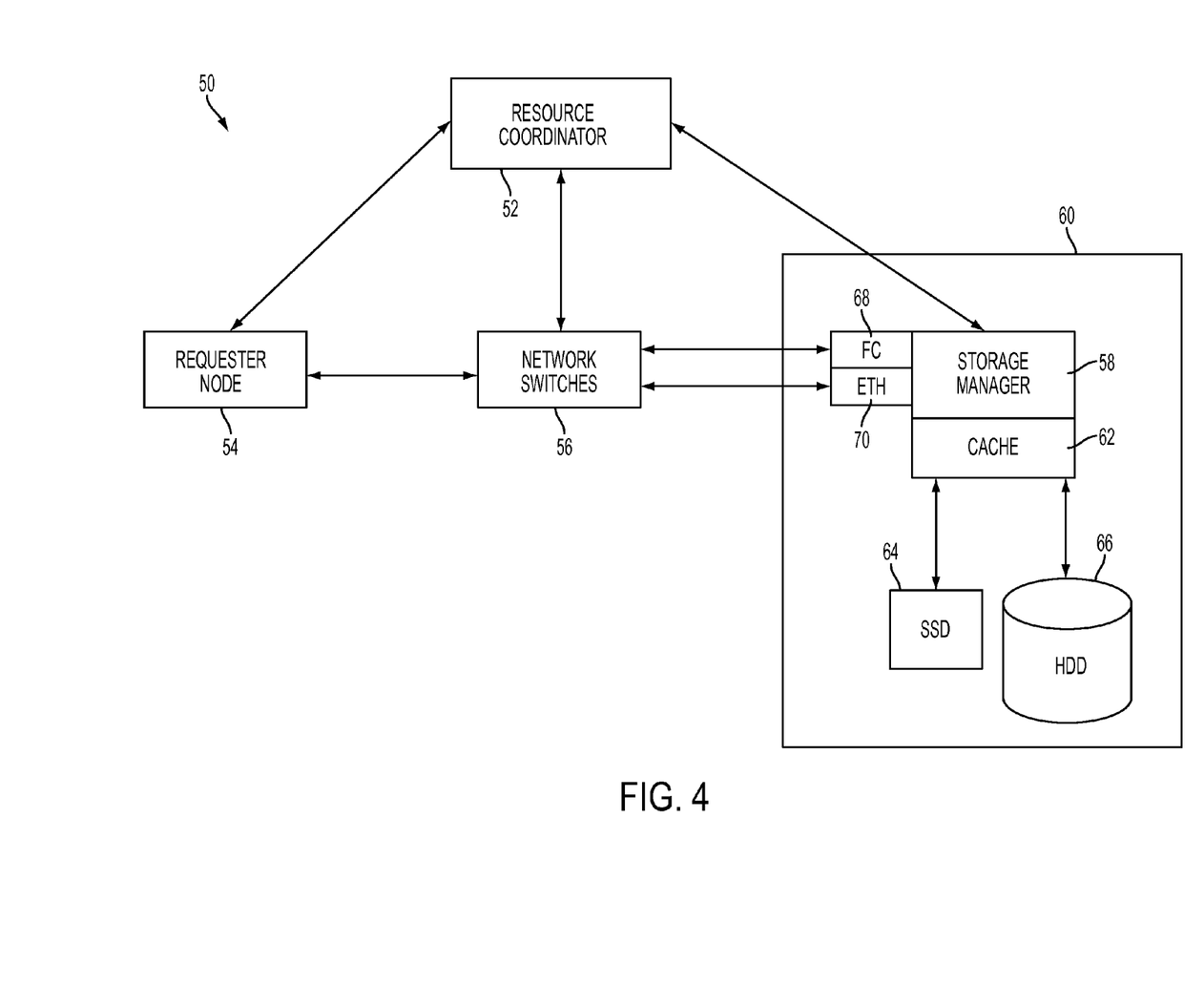
FIG. 4 is a schematic diagram of an apparatus in accordance with an embodiment of the invention.

With reference now to FIG. 4, an embodiment of the present invention may include a data transfer pipeline resource provisioning and optimization device 50 having a resource coordinator 52 that may monitor a requester node 54, network switches 56 and a storage manager 58. For example, the resource coordinator 52 may receive input output (I/O) requirement definitions from the requester node 54, network status and configuration information from the network switches 56, and storage system status and configuration information from the storage manager 58.

In an embodiment of the invention, the storage manager 58 may be integral to a storage system 60, for example, including a random-access memory cache 62, a solid-state drive (SSD) 64 and a hard disk drive (HDD) 66. The storage manager 58 may be connected to the network switches 56 by way of one or more network interfaces, such as, for example, a fiber channel (FC) interface 68 or an Ethernet interface 70. In various embodiments of the invention, the network interface can include, for example, a local area network (LAN) or a wide area network (WAN).

In an embodiment of the invention, data may be transferred from the requester node 54 to the storage system 60, for example, by way of the network switches 56. The data may further be transferred to a specific memory device, such as, for example, the SSD 64 or the HDD 66, for example, by way of the cache 62. Each of these resources, including the network switches 56, the cache 62, and the network interface, such as the fiber channel interface 68 or the Ethernet interface 70, form an individual segment of the data transfer path or pipeline. Of course, an embodiment of the invention may include any number of data transfer path segments, including any number of resources that are not described with particularity in this description.

Data transfer pipeline performance may be affected by resource allocations, such as, for example, network interface and storage area network (SAN) selection, multipathing and routing configuration, quality-of-service (QoS) queuing and scheduling, number and location (e.g., SSD or HDD) of data replicas, cache space allocation and prefetching scheme.

In addition, in an embodiment of the invention, the resource coordinator 52 also may control or provide control information to the requester node 54, the network switches 56 and the storage manager 58. For example, the resource coordinator 52 may assign or allocate specific resources among the network switches 56 and the storage system, provide resource status updates and configuration requests to the storage manager 58 and the network switches 56, provide resource status updates and input/output request acknowledgements to the requester node 54.

In particular, the resource coordinator 52 may receive data transfer requests from the requester node 54 that include a requested category of resources, for example, corresponding to a desired range of resource capacity or a specified service level objective (SLO). The resource coordinator 52 may also receive a list of available component resources from each segment of the data transfer path. For example, the resource coordinator 52 may receive a status list regarding currently available resources of the network switches 56. The status list can include, for example, the number of network resources that are currently available in each of several categories, such as, for example, resource capacity or type of resource.

In a specific example, the resource coordinator 52 may receive a status report from the network switches 56 indicating that at a specified point in time, for example, three bus segment resources are available having a premium performance capacity, two bus segment resources are available having a normal performance capacity, and three bus segment resources are available having a reduced performance capacity. In this example, the performance capacity categories may reflect a relative data transfer capacity of each network resource.

In other embodiments of the invention, the categories may reflect, for example, the various network protocols implemented by available network routers. In any implementation of the data transfer pipeline resource provisioning and optimization device 50, the categories may be represented, for example, by individual numbers (category 1, category 2, category 3, etc.) or by different colors (red category, green category, blue category, etc.).

Similarly, the resource coordinator 52 may receive a status report from the storage manager 58 indicating that at a specified point in time, for example, three storage segment resources are available having a premium performance capacity, two storage segment resources are available having a normal performance capacity, and three storage segment resources are available having a reduced performance capacity. Likewise, the resource coordinator 52 may receive a status report from the storage manager 58 indicating that at a specified point in time, for example, three cache segment resources are available having a premium performance capacity, two cache segment resources are available having a normal performance capacity, and three cache segment resources are available having a reduced performance capacity. As with the network example above, the performance capacity categories may reflect a relative data transfer capacity of each memory or cache resource.

Alternatively, in an embodiment of the invention, the resource coordinator 52 may receive status information regarding the specific performance capacity or type of each resource and use the received status information, for example, to categorize each available resource according to the corresponding capacity or type by associating each resource with a category.

In the embodiment of FIG. 4, the resource coordinator 52 may evaluate or map the available resources corresponding to or associated with each segment of multiple alternate data paths between the requester node 54 and the storage system 60, and analyze the category associated with, corresponding to, or assigned to each of the available resources in order to determine whether or not at least one available resource of the category requested by the requester node 54 is available for every segment of the respective data paths. If a data path between the requester node 54 and the storage system 60 exists having resources associated with the requested category for each and every segment of the data path currently available, then the resource coordinator 52 may allocate an available resource of the requested category corresponding to each segment of the data path to formulate a balanced data transfer pipeline having matched components, that is, resources associated with the same category in each segment, such as, for example, resources having relatively closely matched capacities or meeting a common service level objective.

The data transfer pipeline resource provisioning and optimization device 50 may then perform or execute the requested data transfer task by sending the data over the matched data transfer pipeline, for example, from the requester node 54 to the storage system 60. In this manner, the resource coordinator 54 may optimize the allocated data transfer pipeline by verifying that each of the allocated resources corresponding to each segment of the data path is associated with the same category.

The data transfer pipeline resource provisioning and optimization device 50 of FIG. 4 has the advantage that the allocated data transfer pipeline may meet the requested service level without allocating any resources in any segment of the data path that have a significantly higher capacity than any of the other resources allocated throughout the pipeline. Thus, the data transfer pipeline resource provisioning and optimization device 50 may formulate, or map, a balanced data transfer pipeline meeting the desired or requested capacity or service level without dedicating resources that could be concurrently used to form another data path with a relatively higher performance or service level capacity. In this way, the data transfer pipeline resource provisioning and optimization device 50 minimizes waste of relatively higher capacity resources or data path components while optimizing data transfer pipeline performance or service level capacity with respect to the needed, desired or requested performance or service level.

Alternatively, should the resource coordinator 52 determine that a balanced data transfer pipeline having matched components or resources of the needed, desired or requested category in each and every segment of the data path cannot currently be formulated, for example, because there currently is not an available resource of the needed, desired or requested category in one segment of the data path, then the resource coordinator 52 may determine if the requested task may be downgraded to a different category, such as, for example, the next lower or lesser category or relative performance or service level capacity range. For example, in an embodiment, the request from the requester node may include an indication that the requested data transfer task is downgradable, or that the task may be downgraded to a specified lower category or range of categories.

Should the resource coordinator 52 determine that resources associated with the requested category are not available in every segment of the data path, and that the data transfer task may be downgraded to a lower category, then the resource coordinator 52 may verify whether or not available resources associated with the lower category currently exist in every segment of one of the multiple alternative data paths. If resources associated with the lower category are currently available in each and every segment of a data path, for example, between the requester node 54 and the storage system 60, then the resource coordinator 54 may allocate the resources of the lower or downgraded category to formulate a balanced data transfer pipeline with lower or lesser performance or service level capacity than the requested preference of category.

Thus, if at a particular point in time there is not a component or resource associated with the requested category preference corresponding to a single segment of the data path, and the requested task is downgradable, then all segments of the data path are downgraded to the lower category such that resources of relatively higher capacity are not utilized in a data transfer pipeline that will not perform at the relative capacity range of the higher category. As a result, relatively higher capacity resources may be reserved for data transfer pipelines that will have an overall performance that is relatively close, or matched, to the relative capacities of resources in all segments of the data path, lowering the overall cost associated with data transfers.

Alternatively, should the resource coordinator 52 determine that a balanced data transfer pipeline having matched components or resources of the needed, desired or requested category in each and every segment of the data path cannot currently be formulated, but that the requested task may not be downgraded to a different category, then the resource coordinator 52 may delay, buffer or queue the requested task, for example, placing the task in a waiting queue. In this case, when the delayed or queued task reaches the front of the waiting queue, the resource coordinator 52 may again verify whether or not the requested category of resources are available for every segment of one of the multiple alternative data paths. If so, the resources may be allocated to the delayed or queued task at that time.

Alternatively, should the resource coordinator 52 determine that a balanced data transfer pipeline having matched components or resources of the needed, desired or requested category in each and every segment of the data path cannot currently be formulated, and that the requested task may not be downgraded to a different category, or that the task is downgradable but that matched components or resources of a downgraded category are not currently available, the resource coordinator 52 may reject the requested task. For example, the resource coordinator 52 may send a communication to the requester node 54 indicating that the requested task has been rejected or has not been executed or performed. Of course, a person of ordinary skill in the art will readily apprehend that the requester node 54 may subsequently resend the rejected task for completion.

Upon allocating one or more available resources corresponding to one or more segments of the selected data path, the resource coordinator 52 may send a status update communication indicating the currently unavailable status of the allocated resources to the requester node 54, the network switches 56 or the storage manager 58. In response, the requester node 54, the network switches 56 or the storage manager 58 may update a local resource status list with the unavailable status of the allocated resources.

Similarly, after the data transfer task has been executed or performed to completion, the resource coordinator 52 may deallocate the resources corresponding to each segment of the data path and again send a status update communication, this time indicating the currently available status of the deallocated resources, to the requester node 54, the network switches 56 or the storage manager 58. In response, the requester node 54, the network switches 56 or the storage manager 58 may update a local resource status list with the newly available status of the deallocated resources.

In addition, the data transfer pipeline resource provisioning and optimization device 50 may receive a request, for example, from the requester node 54, including a set of multiple data transfer tasks, each of which may include a requested performance or service level. The resource coordinator 52 may associate each task with a category, such as, for example, a performance or service level capacity range corresponding to the requested performance or service level. In some embodiments, the received request may include a requested category associated with each task. Thus, the request may include a multiset including a number of tasks and requested categories, or requested performance or service levels, associated with the tasks.

The data transfer pipeline resource provisioning and optimization device 50 may decompose the received multiset request, for example, into separate sets of individual tasks, each of which may be associated with a needed, desired or requested category. For example, the request may be decomposed into a set of satisfiable tasks that currently have available resources of the requested category available in every segment of a data path, a set of downgradable tasks that do not have available resources of the requested preference category in every segment of a data path but for which available resources of a lower category are available in all segments of a data path, a set of delayed tasks that cannot be allocated available resources but can be placed in a waiting queue, and a set of rejected tasks that cannot be allocated available resources.

After decomposing the request, the resource coordinator 52 may proceed, for example, to address or handle the tasks in order of priority of each set. For example, the resource coordinator 52 may first handle each of the satisfiable data transfer tasks from the request by allocating resources in the same manner described previously for requests that include a single, individual task. Thus, for example, the resource coordinator 52 may next handle each of the downgradable tasks, only after allocating all of the satisfiable tasks, by allocating lower category resources in the same manner described previously for requests that include a single, individual task. The resource coordinator 52, for example, may next handle the delayed tasks, only after allocating all the downgradable tasks, and for example, finally send a communication to the requester node 54 indicating that the rejected tasks have not been executed or performed.

Figure 5:
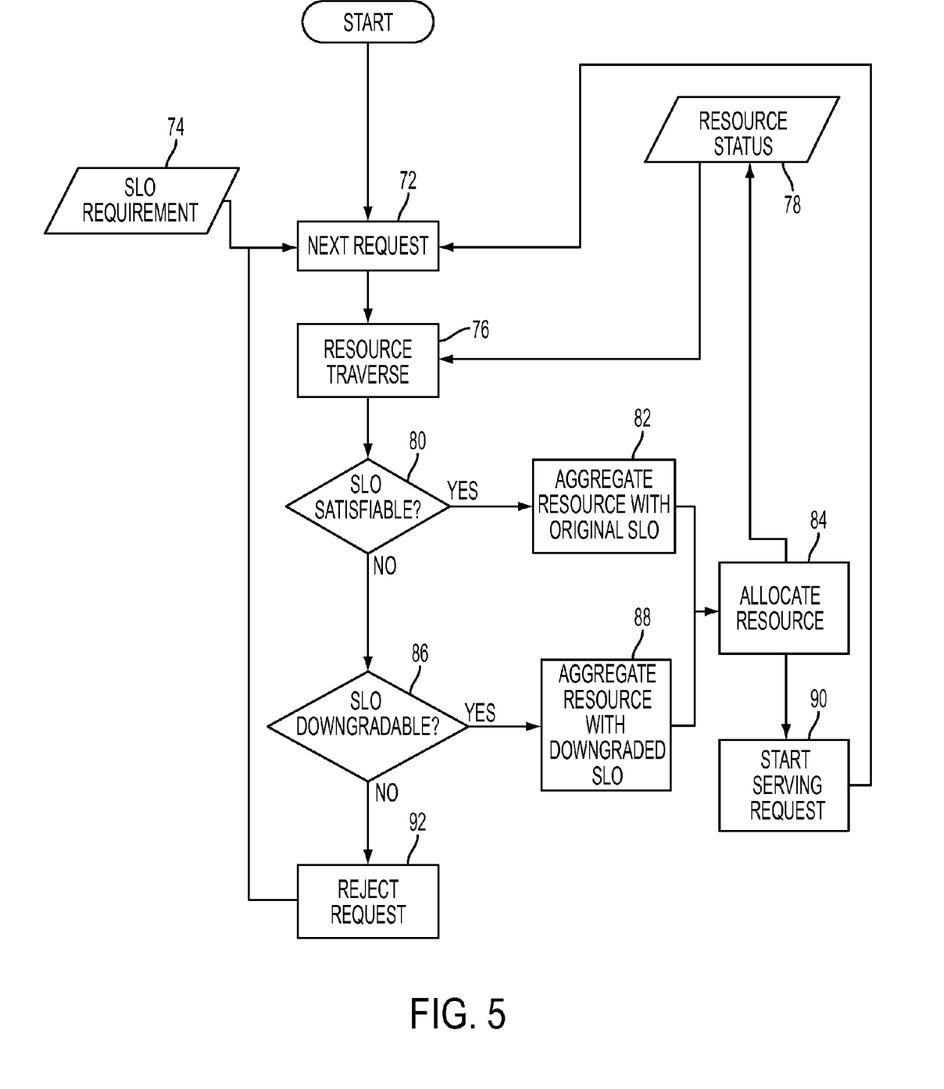
FIG. 5 is a flow diagram of a method in accordance with an embodiment of the invention.

FIG. 5 is a flow chart depicting an embodiment of a method for provisioning and optimizing a balanced data transfer pipeline in accordance with the present invention. A data transfer request may be received, for example, from a requester node, at "Next request" 72. In association with the request, a needed, desired, preferred or requested service level objected (SLO) or performance capacity, or category, may be received at "SLO requirement" 74. At "Resource traverse," 76 the current availability of resources associated with various categories, such as, for example, relative ranges of service level or performance capacity, may be evaluated with respect to information received regarding available resources at "Resource status" 78. At "SLO satisfiable?" 80 the current availability of resources associated with the requested preference category in multiple alternate data paths may be analyzed and verified. If resources of the preferred category are available for all segments of one of the data paths, then the resources may be aggregated with the original SLO at "Aggregate resource with original SLO" 82. The available resources may be booked and assigned to the selected data path, or pipeline, at "Allocate resources" 84.

Alternatively, if the requested task is determined to be not satisfiable at "SLO satisfiable" 80, then a determination may be made regarding whether or not the task may be downgraded, for example 3, to a lower category, at "SLO downgradable?" 86. If the task may be downgraded, then if resources of the downgraded category are available for all segments of one of the data paths, then the resources may be aggregated with the downgraded SLO at "Aggregate resource with downgraded SLO" 88. In this case, as above, the available resources may be booked and assigned to the selected data path, or pipeline, at "Allocate resources" 84. The requested task may be performed or executed at "Start serving request" 90.

On the other hand, if resources of the downgraded category are not available for all segments of one of the data paths, then the request may be rejected at "Reject request" 92, for example, a communication can be sent to the requester node indicting that the requested task has not been executed or performed. Of course, one of ordinary skill in the art will readily apprehend that the task request may be subsequently renewed. Another request may be addressed returning to "Next request" 72.

Figure 6:
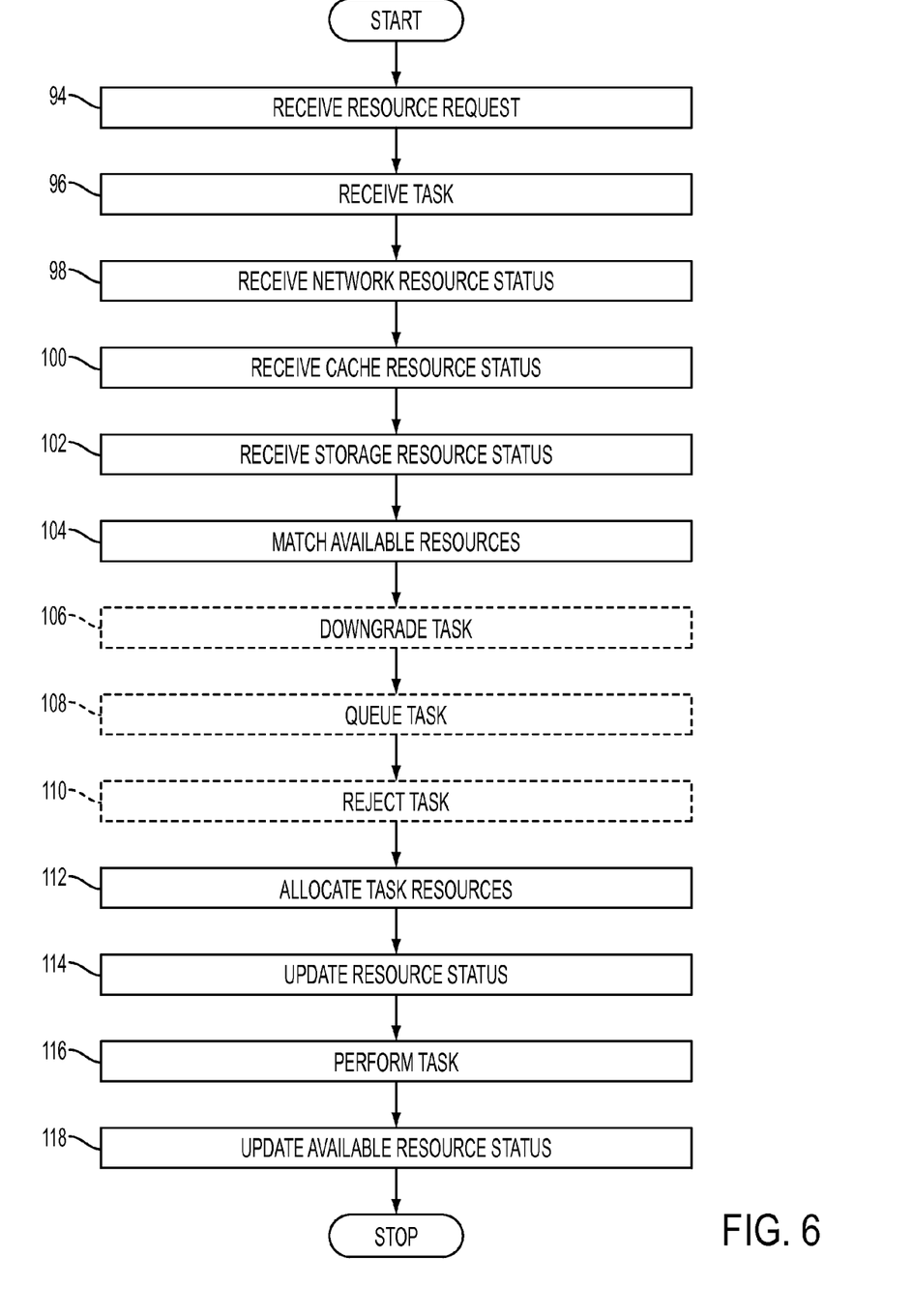
FIG. 6 is a block diagram of a method in accordance with an embodiment of the invention.

FIG. 6 is a block chart depicting an alternative embodiment of a method for provisioning and optimizing a balanced data transfer pipeline in accordance with the present invention. A request for data transfer resources, such as a data transfer pipeline, for example, having a needed, desired, preferred or requested service level or performance capacity, may be received in "Receive resource request" 94. An associated task, such as a data transfer task, may be received in "Receive task" 96. A status communication regarding available network resource capacities, for example, with reference to multiple alternative data transfer paths may be received in "Receive network resource status" 98. Similarly, status communications regarding available cache and storage resource capacities, for example, with reference to multiple alternative data transfer paths, may be received in "Receive cache resource status" 100, and "Receive storage resource status" 102, respectively.

In "Match available resources" 104, available resources, such as, for example, network, cache and storage resources may be matched, or mapped, to formulate a balanced data transfer path with relatively closely matched capacities of the various components or resources in all segments of the data path corresponding to a requested preference category. Optionally (as indicated by dashed lines), if components or resources of the requested preference category are not currently available in one or more segments of the data path, then the task may be downgraded to a lower category, if permissible, in "Downgrade task" 106, and available resources may be matched to formulate a balanced data transfer path with relatively closely matched capacities of the various components or resources in all segments of the data path corresponding to the downgraded category.

Alternatively, in optional "Queue task" 108, the task may be placed in a waiting queue and delayed for execution at a later point in time, for example, should components or resources of the requested preference category or a downgraded category not be available in one or more segments of the data path at the current time. The task may optionally be rejected, and a communication sent to the requester indicating the task has not been executed, in "Reject task" 110.

In the case that matched resources are currently available in block 104 associated with the requested preference category, or in block 106 associated with the downgraded category, or in block 108 at a subsequent time, the corresponding resources may be allocated to the requested task in "Allocate task resources" 112. The status of the allocated resources may be updated, for example, indicating the resources are not currently available, in "Update resource status" 114.

The data corresponding to the requested task may be transferred, for example, from a requester node to a storage system, in "Perform task" 116. The status of the resources may be updated, for example, indicating the resources are once again available after completion of the data transfer task, in "Update available resource status" 118.

Figure 7:
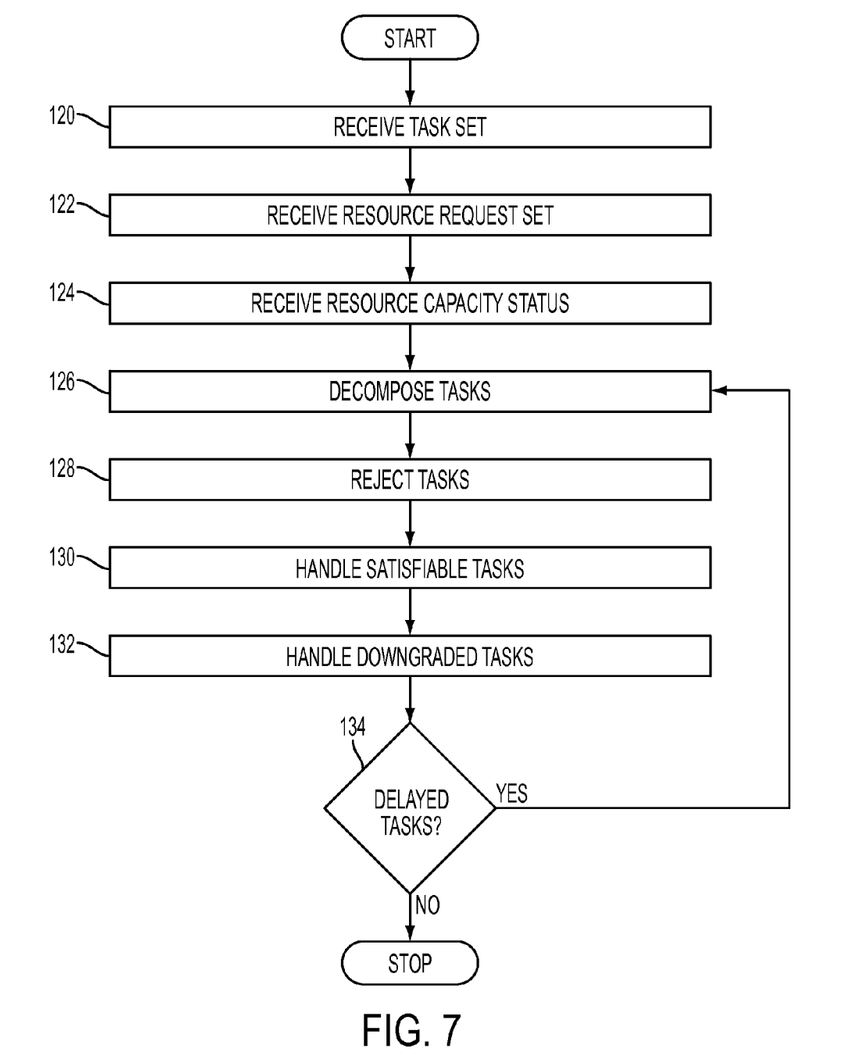
FIG. 7 is a block diagram of a method in accordance with an embodiment of the invention.

FIG. 7 is a block chart depicting another alternative embodiment of a method for provisioning and optimizing a balanced data transfer pipeline in accordance with the present invention. In "Receive task set" 120, a request including multiple tasks, such as data transfer tasks, may be received. Associated resource capacity or service level preferences, may be received in "Receive resource request set" 122. Alternatively, the tasks of block 120 may be received along with the preferences of block 122, for example, in multiset form.

In "Receive resource capacity status" 124 the status information regarding the various components or resources available along multiple alternative data paths may be received. For example, the components currently available at each segment along a data path, such as, for example, a network segment, a cache segment and a storage segment, as well as the performance capacity or service level associated with each component may be received in one or more status communications.

In "Decompose tasks" 126, the multiple tasks received in block 120 may be separated into separate sets, for example, tasks that may be satisfied at the requested service level utilizing resources available at the current time, tasks that may be performed at a downgraded service level utilizing resources available at the current time, and tasks that may be delayed and placed in a waiting queue for execution at a later time. Decomposing the tasks may include mapping or matching available resources associated with the requested category or a downgraded category in a data path with the requested tasks. In "Reject tasks" 128, tasks that could not be matched to available resources of the requested category or a permissible downgraded category may be rejected and, for example, the requester may be notified that the task was not completed.

Satisfiable tasks, that is, those tasks that were successfully matched with, or mapped to, available resources of the preferred category, may be performed before downgraded tasks in "Handle satisfiable tasks" 130. Downgradable may be performed subsequent to the satisfiable tasks in "Handle downgraded tasks" 132. A determination can made regarding whether delayed tasks remain in the queue in "Delayed tasks?" 134, and if so, the delayed tasks may be decomposed into satisfiable tasks, downgraded tasks and newly delayed tasks, or eventually rejected, upon return to "Decompose tasks" 126.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks. The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A computer program product for provisioning resources and transferring data, the computer program product comprising a non-transitory computer readable storage medium having program instructions embodied therewith, the program instructions executable by a processor to cause the process to perform:
   receiving an input/output (I/O) request from a requestor node, the I/O request including a requested category of resources along a data path that includes network switches and memory devices for performing the I/O request, wherein each of the network switches and memory devices is associated with one of a plurality of categories, the requested category of resources is associated with a first category selected from the plurality of categories, each of the plurality of categories characterized by a specified range of resource capacity, wherein at least one network switch and one memory device are associated with the same category of the plurality of categories;
   determining whether resources of the first category of the plurality of categories are available in each segment along the data path that includes network switches and memory devices; and
   based at least in part on determining that resources of the first category are available in each segment along the data path:
      providing a data transfer pipeline across a plurality of segments in the data path, the data transfer pipeline including a plurality of resources of the first category, the providing comprising:
         allocating a first resource of the first category as a first segment in the data path to perform the I/O request, the first resource including a network switch; and
         allocating a second resource of the first category as a second segment in the data path to perform the I/O request, the second resource including a memory device.

2. The computer program product of claim 1, wherein the program instructions are further executable by the processor to cause the process to perform: receiving a resource status corresponding to the first segment.

3. The computer program product of claim 2, wherein the program instructions are further executable by the processor to cause the process to perform: updating the resource status corresponding to the first segment to indicate that the first resource has been allocated.

4. The computer program product of claim 1, wherein the program instructions are further executable by the processor to cause the process to perform:
   decomposing a plurality of I/O requests to form a first list of tasks for which every segment of the data path includes an available resource corresponding to a first associated category and a second list of tasks for which at least one segment of the data path does not include an available resource corresponding to a second associated category; and
   performing the first list of tasks before performing the second list of tasks.

5. A computer program product for provisioning resources and transferring data, the computer program product comprising a non-transitory computer readable storage medium having program instructions embodied therewith, the program instructions executable by a processor to cause the process to perform:
   mapping each of a plurality of available resources corresponding to a first segment of a data path that includes network switches and memory devices to one of a plurality of categories, each of the plurality of categories characterized by a specified range of resource capacity, the available resources corresponding to the first segment of the data path including a network switch, wherein each available resource corresponding to the first segment is associated with one of the plurality of categories, and at least one network switch and one memory device are associated with the same category of the plurality of categories;
   mapping each of a plurality of available resources corresponding to a second segment of the data path to one of the plurality of categories, the available resources corresponding to the second segment of the data path including a memory device, wherein each available resource corresponding to the second segment is associated with one of the plurality of categories; and allocating a first resource of the plurality of available resources corresponding to the first segment and a second resource of the plurality of available resources corresponding to the second segment to a requested task based on the first and second resources being associated with a same category of the plurality of categories.

6. The computer program product of claim 5, wherein the program instructions are further executable by the processor to cause the process to perform: allocating an available resource corresponding to each segment of the data path to the requested task based on each of the allocated resources being associated with the same category.

7. The computer program product of claim 5, wherein the program instructions are further executable by the processor to cause the process to perform:

selecting the same category to be different than the requested category based on a determination that none of the available resources corresponding to the first segment is associated with the requested category.

8. The computer program product of claim 5, wherein the program instructions are further executable by the processor to cause the process to perform:

mapping a plurality of available resources corresponding to a third segment of an alternate data path.

9. The computer program product of claim 5, wherein the program instructions are further executable by the processor to cause the process to perform:

receiving a task associated with a requested category;

determining whether at least one of the available resources corresponding to the first segment is associated with the requested category;

delaying performing the task based on a determination that none of the available resources corresponding to the first segment is associated with the requested category.

* * * * *